C. E. PATRICK.
TATTING SHUTTLE.
APPLICATION FILED JUNE 5, 1917.
1,297,234.
Patented Mar. 11, 1919.
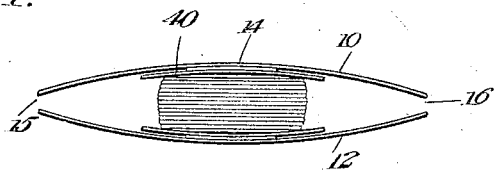
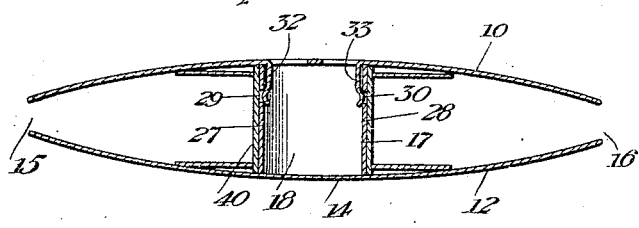
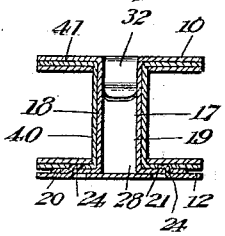
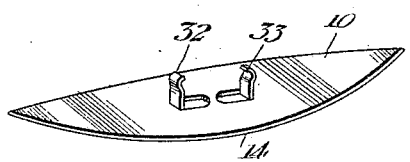
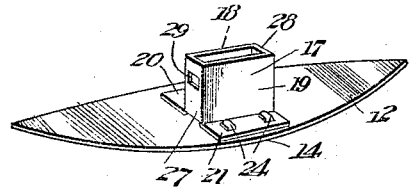
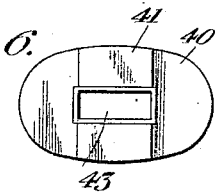
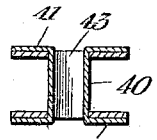
WITNESSES
R. E. Rousseau
Ethel Springer
INVENTOR
C. E. Patrick,
BY Victor J. Evans
ATTORNEY

UNITED STATES PATENT OFFICE.

CHARLES E. PATRICK, OF COLORADO SPRINGS, COLORADO, ASSIGNOR OF ONE-HALF TO ALLIETTA A. CRAIG AND THOMAS P. CRAIG.

TATTING-SHUTTLE.

1,297,234.    Specification of Letters Patent.    Patented Mar. 11, 1919.

Application filed June 5, 1917. Serial No. 172,976.

*To all whom it may concern:*

Be it known that I, CHARLES E. PATRICK, a citizen of the United States, residing at Colorado Springs, in the county of El Paso and State of Colorado, have invented new and useful Improvements in Tatting-Shuttles, of which the following is a specification.

This invention relates to a tatting shuttle and one of the objects is to provide a shuttle adapted to receive a spool of thread which has been previously wound, obviating the necessity of winding the thread at the time it is desired to use the shuttle.

A further object is to provide a two-part shuttle adapted to receive a spool carrying thread and having an oval shape—that is being elongated so as to conform to the shape of the shuttle, said spool being provided with an elongated opening, the walls of which are engaged by securing members connected with the side members of the shuttle.

A still further object is to provide a spool, the body portion of which represents an elongated cross section and which is provided with a slot extending therethrough and having a cross section of similar configuration for coöperation with spool mounting means carried by the side members of the shuttle.

In the accompanying drawings forming part of this application, Figure 1 is a side view of the shuttle with the spool in position therein, Fig. 2 is a vertical longitudinal section, Fig. 3 is a vertical transverse section, Figs. 4 and 5 are perspective views showing the parts of the shuttle detached, and Figs. 6 and 7 are detail views of the spool designed to be used with the shuttle herein described.

In carrying out my invention I manufacture a shuttle comprising a plurality of side members 10 and 12 curved in the manner indicated and tapered from their middle portion 14 to their outer pointed ends 15 and 16. Means for mounting the spool, of novel configuration and construction, comprise a tubular member 17 having side walls 18 and 19, the corresponding ends of which walls are flanged as shown at 20 and 21 and deflected at right angles in order that they may lie in close contact with the inner surface of one of the side members of the shuttle. The flanged members may be connected with the side member in any suitable manner as for instance by means of tongues 24 or the like passing through slots 25 in the flanges.

The tubular member 17, rectangular in cross section, is also provided with end portions 27 and 28, these portions having slots 29 and 30 formed therein, which slots are engaged by tongues 32 and 33 formed on the other of said side members of the shuttle. These tongues may be slightly deflected as shown in order to provide portions positively engaging the slots just mentioned. The elongated tubular member constituting the body portion of the shuttle is especially designed for coöperation with a spool adapted for use with the shuttle described.

The spool comprises a body portion 40 elongated in cross section and provided with flanged members 41 and 42 and with a central slot 43 of elongated cross section, and in the present instance of rectangular cross section, and designed for coöperation with the spool mounting means above specified. It is the intention that the spool constructed as indicated shall be wound with thread before the spool is inserted within the shuttle, and the cross section referred to makes it possible for a shuttle of a given size to carry a thread materially longer than the thread which could be carried by a spool, the body portion of which is cylindrical in cross section. It is obvious that the shuttle provided with spool mounting means formed in the manner specified may also be employed in connection with a spool, the body portion of which is circular in cross section but is provided with an elongated slot, thereby obviating the necessity of providing other means for holding the spool in proper position.

If desired a ball of thread may be wound so that it will provide an elongated opening for the accommodation of the correspondingly formed member of the shuttle.

I claim:

A shuttle comprising a plurality of side members deflected toward each other, in a gradual curve from the central portion thereof toward each end of the respective members, a spool supporting device comprising a tubular member having an unobstructed end portion, said tubular member being carried by one side member and provided with walls extending at right angles with each other, certain of said walls oppositely located being longer than others of said walls also oppositely located with reference to each other, the walls last mentioned being provided with engaging means and the walls first mentioned with flanged securing means, engaging devices on the other side member of the shuttle coöperating with the engaging means on the walls of the spool supporting device and a spool comprising a tubular portion, rectangular in cross section, and flanges connected with the tubular portion, said flanges being spaced slightly from the ends of said tubular portion, the edges of the flanges engaging the deflected side members of the shuttle and the ends of the tubular portion also engaging the side members, whereby the side members are braced at a plurality of points and the curvature of the deflected portions is maintained.

In testimony whereof I affix my signature.

CHARLES E. PATRICK.